United States Patent

Reames

[11] Patent Number: 5,873,026
[45] Date of Patent: Feb. 16, 1999

[54] BATTERY POWERED VOICE TRANSMITTER AND RECEIVER TUNED TO AN RF FREQUENCY BY THE RECEIVER

[76] Inventor: James B. Reames, 6215 Old Keene Mill Ct., Suite A, Springfield, Va. 22152

[21] Appl. No.: 499,453

[22] Filed: Jul. 7, 1995

[51] Int. Cl.⁶ ................................................. H04B 17/00
[52] U.S. Cl. ........................... 455/66; 455/67.7; 455/115; 340/539; 340/636; 340/870.16
[58] Field of Search ................... 455/73, 66, 68, 455/69, 91, 95, 100, 92, 115, 67.1, 67.4, 464, 88, 517, 518, 519, 521, 522; 340/573, 539, 636, 870.09, 870.16

[56] References Cited

U.S. PATENT DOCUMENTS

| | | | |
|---|---|---|---|
| 4,167,733 | 9/1979 | Krause et al. | 340/539 |
| 4,495,648 | 1/1985 | Giger | 455/69 X |
| 4,734,680 | 3/1988 | Gehman et al. | 340/539 |
| 4,894,856 | 1/1990 | Nakanishi et al. | 455/464 |
| 4,906,972 | 3/1990 | Spencer | 340/539 |
| 5,119,072 | 6/1992 | Hemingway | 340/573 |
| 5,201,067 | 4/1993 | Grube et al. | 455/95 X |
| 5,371,900 | 12/1994 | Bar-On et al. | 455/88 X |
| 5,371,901 | 12/1994 | Reed et al. | 455/88 X |
| 5,511,232 | 4/1996 | O'Dea et al. | 455/88 X |

*Primary Examiner*—Reinhard J. Eisenzopf
*Assistant Examiner*—Philip J. Sobutka
*Attorney, Agent, or Firm*—Lane, Atken & McCann

[57] ABSTRACT

A microprocessor based transmitter and a microprocessor based receiver in which a user interface is located on the receiver. The transmitter has an internal DC digital voltage measuring circuit to determine the voltage level of the battery powering the transmitter. Periodically, the transmitter's microprocessor inserts this digitally encoded voltage level in the sub-code area of the digital data being transmitted. The receiver decodes the DC voltage level of the transmitter battery, displays it, and inserts this voltage level in the sub-code area of its digital audio output signal. The voltage level of the transmitter battery is automatically recorded in the sub-code area of the DAT. By observing the DC voltage level, a trained operator can determine when the batteries are nearing the end of their useable life or that the battery voltage level is approaching its cut-off level.

4 Claims, 3 Drawing Sheets

BATTERY POWERED VOICE TRANSMITTER AND RECEIVER TUNED TO AN RF FREQUENCY BY THE RECEIVER

BACKGROUND OF THE INVENTION

1. Field of the Invention

This invention relates to an improved, voice transmitter/receiver system, and more particularly to a microprocessor controlled transmitter and microprocessor controlled receiver system in which the receiver is used to program the transmitter's RF operating frequency and RF power output level, as well as other features. The operating frequency to which the receiver is tuned is programmed into the transmitter and insures that the receiver and transmitter are operating on the same frequency.

2. Description of the Prior Art

As will be appreciated by those skilled in the art, in certain situations, it is desirable to listen to and/or record at a remote receiver a conversation between two or more people. A microphone converts the acoustic signal to an electrical analogue signal and a transmitter, which is connected by a wire to the microphone, broadcasts the voice signal to a remotely located receiver as a modulated radio frequency (RF) signal, preferably as a digitally encoded signal. The transmitter and receiver for these applications are designed to operate over a selectable one of several different operating frequencies. This allows the selection of an operating frequency that is not being overwhelmed by an interfering broadcast source on the same or adjacent frequencies. In prior art the transmitter's operating frequency and the receiver's operating frequency are inputted separately to the transmitter and to the receiver. Typically, prior art systems use so-called dip switches or jumpers located on the transmitter to input the transmitter's operating frequency and a set of dip switches or a dial on the receiver to set the operating frequency of the receiver. Since in the prior art the transmitter's and receiver's operating frequency are inputted separately, different operating frequencies can be erroneously input to the transmitter and receiver.

Usually, in these systems, the transmitted voice signal is recorded on a tape; in a digital transmitter/receiver system the digital receiver output can be recorded on a Digital Audio Tape (DAT). In any event, the recorded signal may be degraded or may have gaps or other abnormalities. There are a number of possible causes for such abnormalities. Some of these possible causes are related to the transmission of the signal by the transmitter to the receiver and other possible causes are not. In analyzing a voice recording, it is often useful to identify, if possible, the cause of an abnormality or apparent abnormality in the recording.

SUMMARY OF THE INVENTION

An object of this invention is the provision of a transmitter/receiver system in which setting the receiver operating frequency also sets the operating frequency of transmitter with which it is to be used.

An object of this invention is the provision of using the receiver to program the transmitter/receiver system features and/or functions.

Another object of this invention is the provision of a transmitter which transmits data with regard to certain of its operating parameters useful in interpreting abnormalities in the voice data.

Briefly, this invention contemplates the provision of a microprocessor based transmitter and a microprocessor based receiver in which a user interface is located on the receiver. When the transmitter is connected to the receiver and the receiver is tuned to a clear frequency, the receiver's microprocessor inputs the receiver operating frequency to the transmitter, when the enter button is depressed.

The transmitter has an internal DC digital voltage measuring circuit to determine the voltage level of the battery powering the transmitter. Periodically, the transmitter's microprocessor inserts this digitally encoded voltage level in the sub-code area of the digital data being transmitted. The receiver decodes the DC voltage level of the transmitter battery, displays it, and inserts this voltage level in the sub-code area of its digital audio output signal. The voltage level of the transmitter battery is automatically recorded in the sub-code area of the DAT. By observing the DC voltage level, a trained operator can determine when the batteries are nearing the end of their useable life or that the battery voltage level is approaching its cut-off level. If the battery cannot be changed, the battery voltage level record can be used to establish that the battery ran down versus equipment failure or a blocked RF signal path. By plotting the DC voltage level versus time of transmission, a "battery discharge curve" can be generated and used to establish that the batteries became depleted during the recording of an incomplete conversation rather than the transmitter being turned off.

The transmitter has a "delayed off" circuit. When the transmitter "on-off" switch is switched from "on" to "off," the "delayed off" circuit is activated, and the transmitter microprocessor inserts a digital code in the sub-code region that the remote "on-off" switch was turned "off." The transmitter sends this digital code three times and then switches the transmitter to the standby (off) mode. The receiver inserts this digital code in the sub-code area of its digital audio output signal and the fact that the transmitter was turned "off" using the remote switch is automatically recorded in the sub-code area of the DAT cassette. This information establishes that the wearer of the transmitter switched the unit "off" rather than the battery running down or the RF signal fading out.

The transmitter has its serial number digitally encoded and stored in internal non-volatile memory. Periodically, the transmitter's microprocessor recalls and inserts this digital serial number in the sub-code area of the digital data being transmitted. The receiver inserts the transmitter's serial number in the sub-code area of its digital audio output signal. The transmitter's serial number is automatically recorded in the sub-code area of the DAT cassette. This information establishes exactly which transmitter was used to intercept this conversation for record purposes and for use in judicial proceedings.

A "Confidence Signal (Beep)" feature when activated, and when DC power is applied to the power input connector, causes the transmitter's microprocessor to periodically activate the transmitter and transmit a short digital test signal. The receiver measures the confidence signal's RF signal strength, and the format of the transmitted digital data is checked and displayed by the receiver. In addition, the received "Confidence Signal (Beep)" is forwarded to the digital audio output. The "Confidence Signal (Beep)" is recorded in the sub-code area of the DAT.

As the person wearing the transmitter travels away from the receiver (monitoring location), a trained operator can determine if the transmitter is within the communication range of the transmitter/receiver system by observing the displayed RF signal level and quality. Reception of the periodic "Confidence Signal (Beep)" establishes that the transmitted signal will reach the receiver when the transmitter is activated. Failure to receive the "Confidence Signal" indicates the receiver should be relocated to pick up the "Confidence Signal."

When the transmitter user activates a panic/alarm switch external to the transmitter and connected to it by a wire, the transmitter's microprocessor recalls from memory and causes the transmitter to transmit a special panic/alarm signal in the sub-code area of the digital serial bit stream. When the receiver detects this panic/alarm signal, a visual and audible alarm is sounded to summon help, and the panic/alarm code is available at the digital output of the receiver for recording onto the DAT cassette recorder.

Two complete digital receivers are built into the receiver. Each of these two receivers has its own antenna at spaced apart locations. If the RF signal radiated by the transmitter is reflected by buildings, objects and/or terrain, the signal arriving at the RF receiver may have traveled over more than one path. If the transmitted signal reaching the receiver includes signals from one or more reflected (indirect) paths, the transmitted signal will usually interfere with itself. This will result in fades and/or cancellation of the transmitted signal. The use of two complete receivers with separate antennas reduces the effect of reflected transmitted signals. If the transmitted signal is reduced or canceled at one receiving antenna, it usually is not canceled at the other receiving antenna since the spacing between the two receiving antennas is not equal to a wavelength of the signal. The output of both receivers is monitored by the receiver's microprocessor, and the receiver with the best signal is selected by the microprocessor and used.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
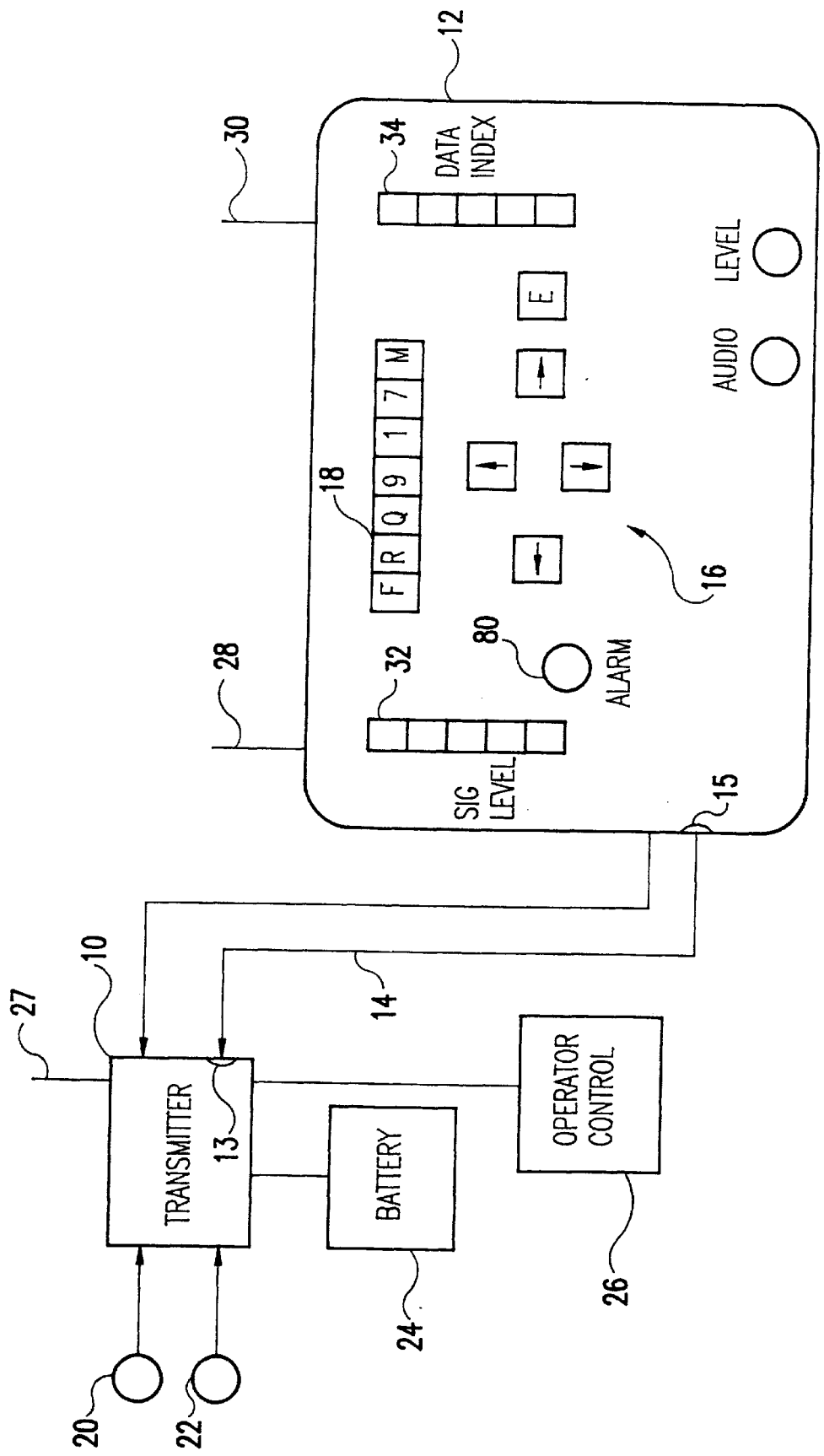
FIG. 1 is a pictorial block diagram showing the transmitter and receiver coupled together.

Referring now to FIG. 1, a transmitter/receiver system in accordance with the teachings of this invention comprises a microprocessor controlled transmitter 10 and a microprocessor controlled receiver 12. The transmitter has a data communications port 13 and the receiver has a data communications port 15, and data communication between the microprocessors over a communications link 14 allows an operator to set the RF operating frequency of both transmitter and receiver to the value inputted via an interface (i.e. cursor keys 16 and LCD display 18) on the front panel of the receiver 12. It will be appreciated that this ability to set both the transmitter and receiver RF operating frequency with a single operator input insures that both transmitter and receiver are set to the same RF operating frequency. By observing a signal level indicator 32, the operator can determine if the receive frequency to which the receiver is tuned is already being used, and select a wide, clear area of the RF spectrum before programming the transmitter. The link 14 may be a wireless link (e.g. an optical link) or a hardwire link; in the preferred embodiment of the invention, a hardwire link is used. The user interface keys 16 and LCD display 18 are also used to set the RF power output of the transmitter 10 as well as other special features.

In the preferred embodiment of the invention, the transmitter/receiver system is a stereo system in which the audio signal is converted to a standard pulse code modulated (PCM) digital signal and this digital signal is transmitted by phase modulating an RF carrier, which is tunable over a very wide range. The capability of selecting an operating frequency over a very wide range permits the trained operator to operate in a clear area of the RF spectrum and to select a frequency whose wavelength is optimized to radiate out of the room in which the transmitter will be located. This basic technology is known and used in the art and may be implemented using commercially available integrated circuits developed for digital audio recording and telecommunications applications. This preferred stereo embodiment of the invention has two microphones 20 and 22 connected to the audio input of the transmitter and an antenna 27 connected to the transmitter's output. A battery power source 24 for the transmitter and a remote operator control 26 are also connected to the transmitter. The operator control provides for on, off, standby and panic inputs from an operator.

As previously explained, in a preferred embodiment of the invention, the receiver has two spaced apart antennas 28 and 30 that are connected respectively to separate digital stereo receiver channels in the receiver 12. The receiver that provides the better performance, as indicated by the signal level indicator 32 and a data error index indicator 34, is automatically selected by the microprocessor and its information is outputted for recording and monitoring.

Here it should be noted, the left and right cursor keys allow the operator to select an element or elements of the LCD display, which are then scrolled up or down by means of the top and bottom cursor keys. The LCD display segments are scrolled to display the function (e.g. frequency, power) to be changed and the value of the function. When the desired function and value are displayed, the operator pushes the enter key "E" to input the displayed value of the displayed function into the system. In a specific embodiment of the invention, the RF operating frequency is selectable in 1M Hertz steps from −5% of a center frequency to +5% of a center frequency within a range between 700M Hertz and 950M Hertz; approximately eighty operating frequencies from which an operator can chose. The transmitter also has a range of RF output powers (e.g. from 10 milliwatts into a 50 ohm load to 750 milliwatts into a 50 ohm load), which can be selected and set by an operator via the receiver cursor keys 16 and LCD display interface 18.

Figure 2:
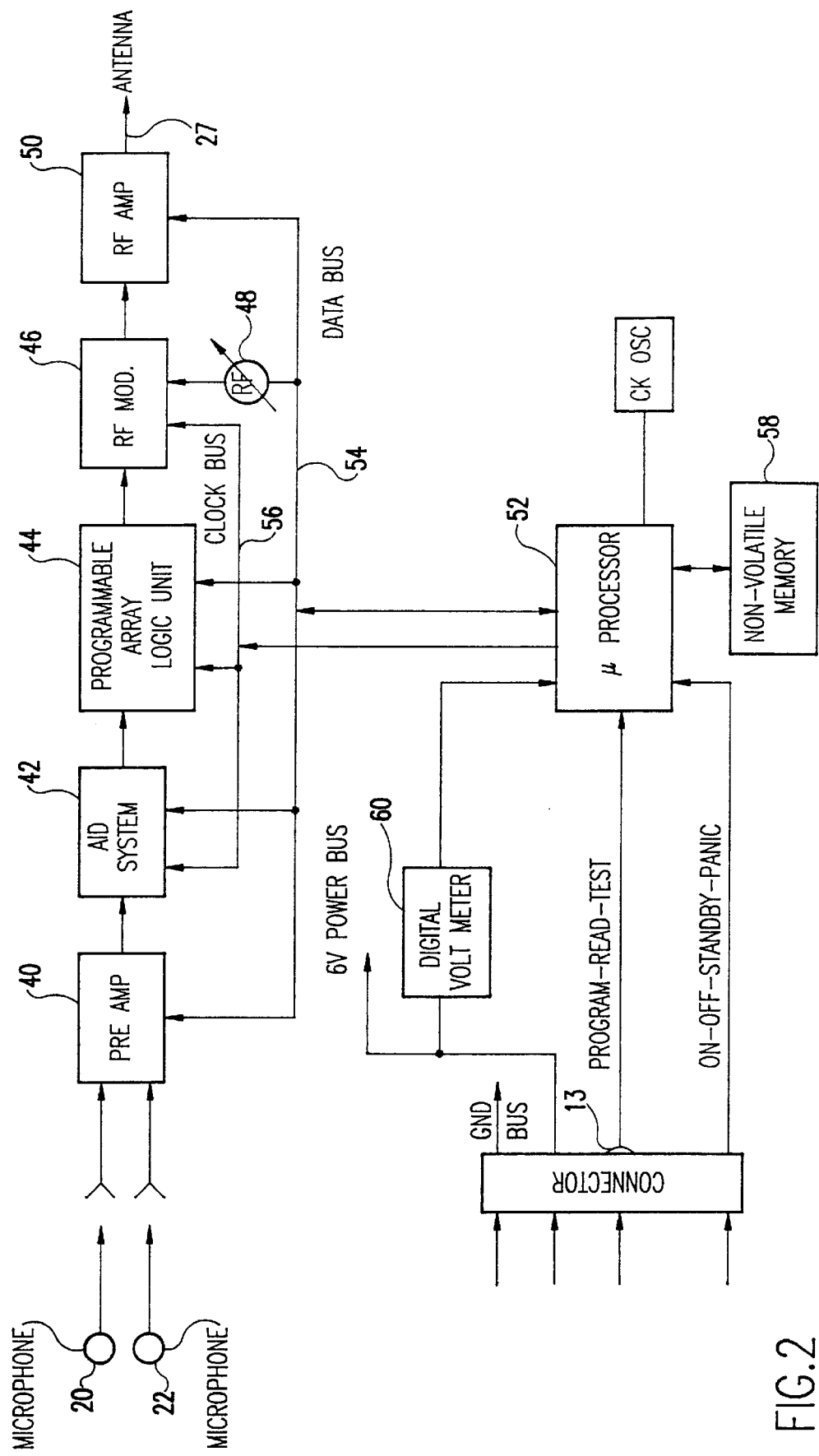
FIG. 2 is a functional block diagram of a transmitter in accordance with the teachings of this invention.

Referring now to the transmitter functional block diagram of FIG. 2, the two microphones 20 and 22 are connected as inputs to a stereo audio encoding and broadcast channel which starts with a stereo, audio amplifier 40 and proceeds to the output antenna 27. The output of the amplifier 40 is coupled to an analogue to digital (A/D) converter system 42. Converter 42 samples the audio input, converts the sample amplitudes to digital value, and then encodes the digital values in a pulse code modulated (PCM) format, which is widely used for stereo, digital audio recording and in telecommunications applications. Integrated circuit chips and chip sets are commercially available to execute the functions called for in A/D system function block 42. A standard PCM format for a stereo audio recording includes four, sixteen bit frames; one for the right hand stereo channel, one for the left hand channel and two sub-code frames. Here the right and left stereo channel frames are used along with only part of the sub-code frames. The output of the A/D system 42 is coupled to the input of a programmable array logic unit 44, which provides various standard error recovery coding strategies suitable for digital audio applications. An integrated circuit chip implementation for this error recovery coding function is available from several manufacturers. The PCM output of the error recovery encoder 44 is coupled as an input to an RF modulator 46. An RF oscillator or synthesizer 48, whose output frequency is digitally selectable, provides the other input to the modulator 46. In this specific embodiment of the invention, the PCM signal phase modulates the RF carrier with one phase representing one of the two PCM values and the other phase representing the other PCM value. The modulated RF output of modulator 46 is coupled as an input to an RF amplifier 50 whose output power is digitally selectable. The output of the amplifier 50 is coupled to the antenna 27.

A transmitter microprocessor 52 controls various functions of the transmitter. A data bus 54 and a clock bus 56 couple the microprocessor 52 to the functional elements in the audio encoding and broadcast channel. A digital data input on bus 54 sets the operating frequency of the RF oscillator 48 and a digital data input signal on bus 54 to the RF amplifier 50 sets its power output. These values are set in accordance with inputs to the microprocessor 52 from the receiver over the Program-Read-Test bus connected to input port 13. These settings are stored in a non-volatile memory 58 so that they can be read out even in the event of a loss of power to the transmitter.

A bus labeled On-Off-Standby-Panic couples the output operator control 26 (FIG. 1) as an input to the processor 52. The processor places the audio encoding and broadcast channel in the commanded status in response to an on, off or standby input. In addition, in response to an off input command on this bus, the processor couples an off message to the programmable array logic unit 44 over bus 54, where the off message is inserted in a sub-code frame of the PCM digital output to the RF modulator 46, and broadcast to the transmitter, before the channel is placed in a quiesced, non-broadcasting off state. As explained previously, in a preferred embodiment, this off message is repeated three times. Similarly, in response to a panic input from control 26, the processor 52 couples a panic message into the programmable array logic unit 44, where the panic message is inserted in a sub-code frame and broadcast to the transmitter.

A digital voltmeter 60 measures the voltage of the transmitter's battery power source 24 and an output of the meter 60 is coupled as an input to the microprocessor, which stores these values in non-volatile memory 58. Periodically, the microprocessor calls the voltage level value from memory, and couples it to the programmable array logic unit 44 where it is inserted in a sub-code frame and broadcast to the receiver.

When the transmitter is in a standby state, the microprocessor 52 periodically couples a Beep signal to programmable array logic unit 44, where it is inserted in one of the sub-code frames and broadcast to the receiver.

Periodically when the transmitter 10 is on, microprocessor 52 recalls the serial number of the transmitter stored in non-volatile memory 58, and couples this data over the data bus 56 to the programmable array logic unit 44 where it is inserted into the sub-code frame and broadcast to the receiver.

Figure 3:
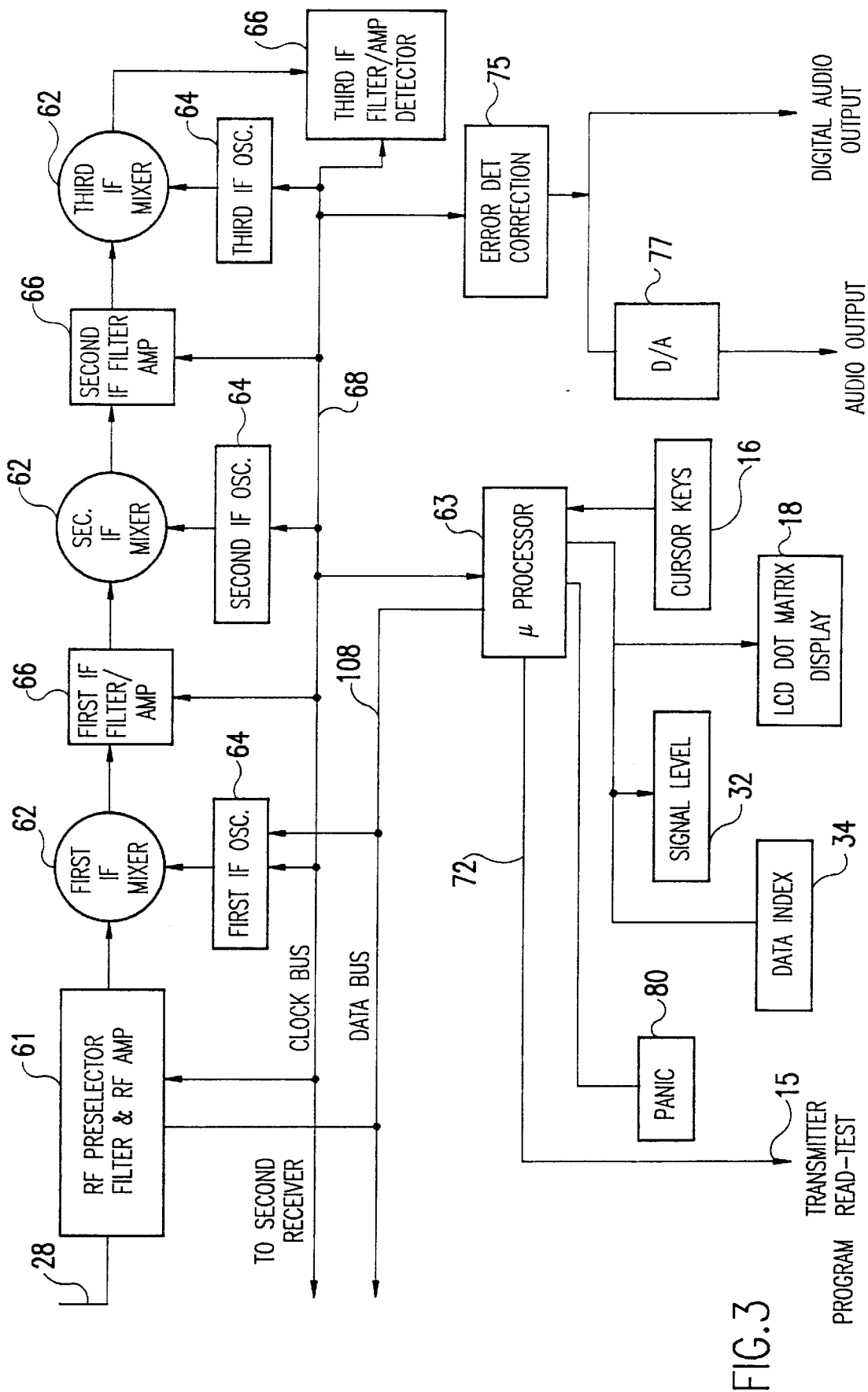
FIG. 3 is a functional block diagram of a receiver in accordance with the teachings of this invention.

Referring now to the functional block diagram of the receiver in FIG. 3, it shows only the superheterodyne digital stereo receiver channel for the antenna 28. It will be appreciated that in the preferred two antenna configuration of the receiver, there is another superheterodyne receiver channel (not shown) for signals received on antenna 30. Each channel operates the same as the other and each is controlled by the microprocessor 63.

The antenna 28 is coupled to an RF preselector, filter, and an RF amplifier 61 whose output passes through three IF stages is connected to a superheterodyne detector of the type widely used in the radio receiver art. This specific embodiment of the invention has three intermediate frequency (IF) stages. Each IF stage is comprised of a mixer 62, frequency oscillator 64, and an IF filter 66. An output of microprocessor 63 on a data bus 108 sets the frequency of the first oscillator 64 such that when the RF input signal is mixed with the first IF oscillator 64, the output signal to the first IF filter/amplifier is the proper frequency. This down converting continues in the second and third RF stages until the input RF signal received at antenna 28 is outputted from the third IF at baseband. The microprocessor 63 sets the operating frequency of the receiver by a digital output from the cursor keys 16, which are coupled to port 15. For example, the output on bus 72, which is coupled to the transmitter's microprocessor 52 (FIG. 2) via link 14 (FIG. 1), sets the transmitter's RF frequency to match the receiver's RF operating frequency. The output of the final IF filter amplifier/detector 66 is the PCM signal separated from the RF carrier.

The output of the final stage filter is connected directly to the error detection correction 75 where errors are corrected and the data placed in correct time order. This data includes voltage level messages and other messages in the sub-code frames that have been transmitted by the transmitter. The error detection and correction circuit 75 is where any errors in the transmitted signal are detected and those errors that can be corrected are corrected. The corrected PCM code output of the error detection and correction circuit 75 is coupled to a digital to analogue converter 77 where the PCM code is converted to an analogue audio signal and coupled to the analogue audio output port. The number of errors in the transmission, the number of correctable errors and the number of uncorrectable errors are coupled from the error detection and correction circuit 75 to the microprocessor 63. Based on this data input, the microprocessor provides a qualitative display of the quality of the received audio transmission on the data index display 34 (FIG. 3). The microprocessor 63 also monitors the strength of the incoming signal via bus 108 at the input to the RF amplifier 61 relative to the set power output of the transmitter and gives the operator a qualitative indication of the received power level on the signal level display 32. Similarly, a confidence signal beep can be received, processed, and outputted to determine if the transmitter and receiver are within a solid communication range. In response to detection of an off message in the sub-code frame, the microprocessor 63 can display a transmitter off message on the display 18. A panic message can be displayed and in addition used to sound an audible alarm 80. Similarly, the battery voltage signal and the serial number signal can be processed by the receiver and outputted for display and/or recording.

While the invention has been described in terms of a single preferred embodiment, those skilled in the art will recognize that the invention can be practiced with modification within the spirit and scope of the appended claims. For example, the functions of the programmable array logic unit 44 could be performed by a dedicated microprocessor or by the microprocessor itself. Modulation/demodulation technologies other than those described in the specific embodiment of the invention can be used in the practice of the invention. In addition, the "no voice" technology described in my copending application, Ser. No. 08/362,882, filed Dec. 23, 1994, and which is incorporated herein by reference, can be used in the practice of this invention.

Having thus described my invention, what I claim as new and desire to secure by letters patent is as follows:

1. A battery operated transmitter/receiver system for transmitting voice band audio signal comprising in combination;

means to transmit said voice band audio signal as a modulated radio frequency signal;

battery voltage detection means coupled to said battery, said battery voltage detection means generating a signal indicative of the voltage of said battery;

means to encode said signal indicative of the voltage of said battery;

said means to transmit periodically transmitting said signal indicative of the voltage of said battery to said receiver, a recorder connected to said receiver, said recorder recording successive ones of said signals indicating the value of the voltage of said battery power source, whereby said recording can be used to establish a rundown of said battery power source.

2. An audio band modulated RF transmitter/receiver system in which the transmitter is programmable to broadcast at a selected one of a plurality of RF operating frequencies and the receiver is programmable to demodulate a selected one of said plurality of RF operating frequencies, said system comprising in combination:

a receiver physically separated from the transmitter, including a receiver microprocessor, an operator interface coupled to said receiver microprocessor, and an RF demodulation channel coupled to said receiver microprocessor, said receiver microprocessor setting said demodulation channel to demodulate a selected one of a plurality of RF operating frequencies in response to a first input to said receiver microprocessor from said operator interface;

a transmitter physically separated from the receiver including a transmitter microprocessor and an RF modulation channel coupled to said transmitter microprocessor, said transmitter microprocessor setting said modulation channel to a selected one of said plurality of RF operating frequencies in response to a second input from said receiver microprocessor; and said receiver microprocessor generating said second input in response to said first input to said receiver microprocessor from said operator interface; and a hard wired connection for coupling said second input from said receiver microprocessor to said transmitter microprocessor, whereby said operator interface establishes an RF operating frequency for both said transmitter and said receiver;

a battery power source for energizing said transmitter, said transmitter further including a voltage detector that monitors the voltage of said battery power source and generates a signal indicating the value of the voltage of said battery power source, said transmitter microprocessor periodically causing said transmitter to transmit said signal indicating the value of the voltage of said battery power source to said receiver, a recorder connected to said receiver, said recorder recording successive ones of said signals indicating the value of the voltage of said battery power source, whereby said recording can be used to establish a rundown of said battery power source.

3. An audio band modulated RF transmitter/receiver system as in claim 2 further including on/off means coupled to said transmitter microprocessor means to cause said microprocessor to turn off said transmitter in response to an off input from said on/off means, said transmitter microprocessor causing said transmitter to transmit a signal encoding said off input in response to said off input prior to turning off said transmitter.

4. An audio band, modulated, RF transmitter/receiver system as in claim 2 wherein said microprocessor periodically activates said transmitter to transmit a short digital test signal.

* * * * *